United States Patent [19]
Hall

[11] 4,311,276
[45] Jan. 19, 1982

[54] VARIABLE AREA NOZZLE FOR A GAS TURBINE ENGINE

[75] Inventor: John M. Hall, Bristol, England
[73] Assignee: Rolls-Royce Limited, London, England
[21] Appl. No.: 47,554
[22] Filed: Jun. 11, 1979

[30] Foreign Application Priority Data

Jun. 24, 1978 [GB] United Kingdom ............... 27820/78

[51] Int. Cl.$^3$ ............................................. B64C 15/02
[52] U.S. Cl. ............................................. 239/265.39
[58] Field of Search ...................... 239/265.39, 265.33, 239/265.37, 265.19; 60/230, 232; 244/110 R, 110 B

[56] References Cited

U.S. PATENT DOCUMENTS

| | | | |
|---|---|---|---|
| 2,928,234 | 3/1960 | Brown | 239/265.39 |
| 3,837,580 | 9/1974 | Camboulives et al. | 239/265.39 |
| 4,099,199 | 9/1977 | Nightingale | 239/265.39 |

FOREIGN PATENT DOCUMENTS 865881 4/1961 United Kingdom ........... 239/265.39
1551216 6/1970 United Kingdom ........... 239/265.39

*Primary Examiner*—Robert B. Reeves
*Assistant Examiner*—Gene A. Church
*Attorney, Agent, or Firm*—Stevens, Davis, Miller & Mosher

[57] ABSTRACT

In a jet pipe and variable area final nozzle assembly, the jet pipe 12 is necked at a region upstream of the final nozzle to reduce the diameter of the remainder of the jet pipe downstream of the neck to a diameter more nearly equal to but not less than the maximum throat area of the nozzle. The nozzle flaps are pivoted to the end of the jet pipe, although they could alternatively be translatable, and have an upstream portion 20 which overlies the jet pipe. An actuating mechanism preferably in the form of a unison ring 30 operated by jacks is mounted around the reduced diameter portion of the jet pipe and operates on the upstream portions of the nozzle flaps via a roller and cam arrangement 26, 24 to vary the area of the nozzle. An outer fairing 14 which now need be of no greater diameter than the maximum diameter of the jet pipe surrounds the jet pipe and the actuating mechanism (see FIG. 1).

3 Claims, 4 Drawing Figures

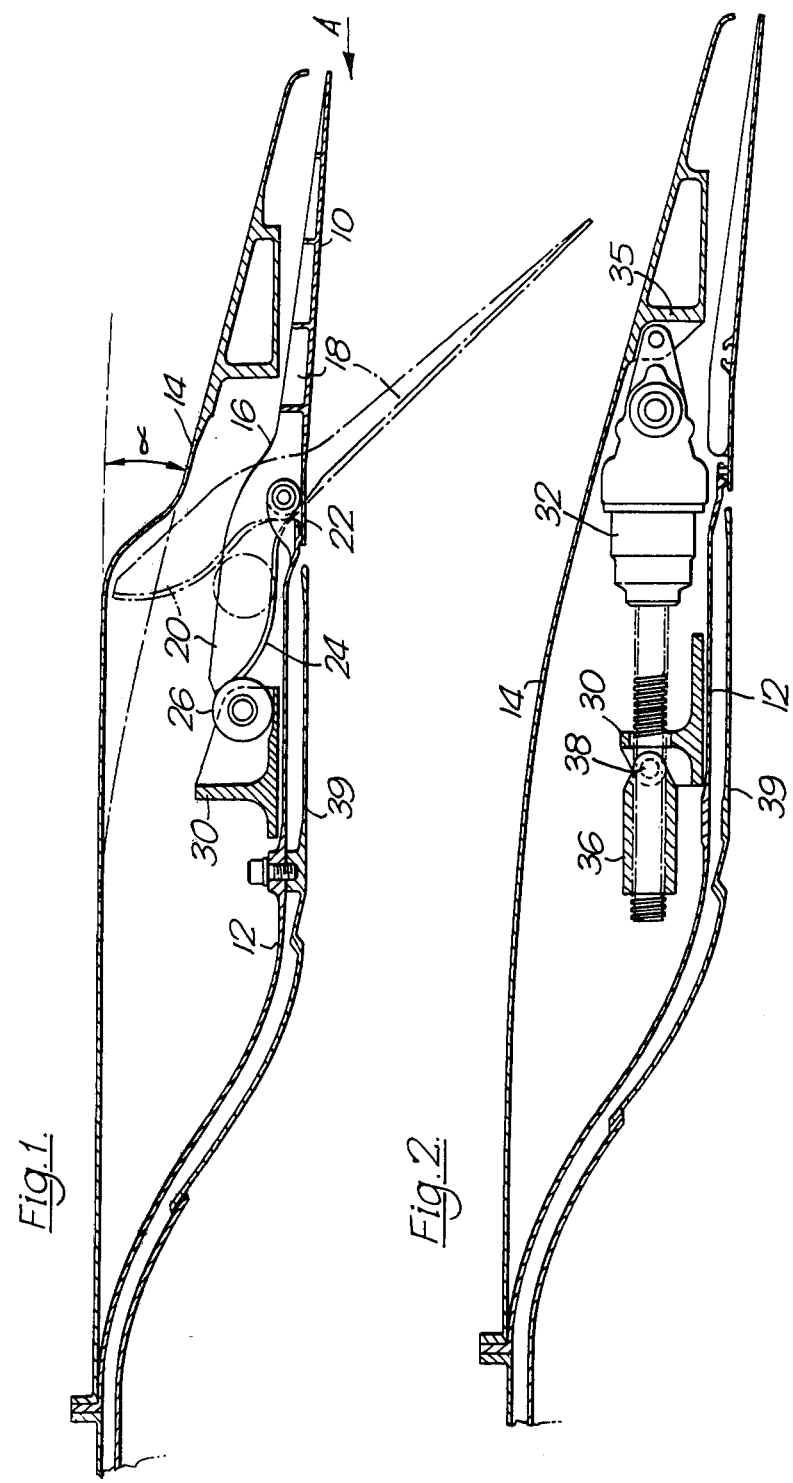

VARIABLE AREA NOZZLE FOR A GAS TURBINE ENGINE

DESCRIPTION

The present invention relates to a jet pipe and variable area final nozzle assembly for a gas turbine engine.

In our U.K. Pat. No. 1,278,801 there is described a variable area nozzle for a gas turbine engine in which an annular arrangement of flaps defining the outlet of the nozzle are pivoted at their upstream ends to a jet pipe. A cam and roller mechanism operates between the flaps and a surrounding shroud to pivot the flaps to vary the nozzle area by translation of the shroud in a direction axially of the nozzle.

It can be seen from this patent specification that the shroud lies around the outside of the nozzle petals and the rollers run on cam tracks attached to the outer surfaces of the nozzle petals. The actuators which translate the shroud are also outside the jet pipe diameter and need a further fairing to cover them.

The fact that the shroud translates axially around the outside of the jet pipe means that the diameter of the upstream end of the shroud must be greater than the greatest diameter of the jet pipe which the shroud surrounds, and is often significantly greater than the maximum diameter of the jet pipe. This adds to the diameter of the engine as a whole.

The present invention seeks to provide a nozzle and actuation system which does not require a translating shroud around the nozzle flaps, and in which the actuation mechanism lies within the usual jet pipe fairing, or within the aircraft structure where the engine is buried therein.

According to the present invention a jet pipe and variable area final nozzle assembly for a gas turbine engine comprises a jet pipe, a plurality of nozzle flaps disposed at the downstream end of the jet pipe and movable to vary the area of the nozzle outlet, and wherein the jet pipe is necked at a region upstream of the nozzle to reduce the diameter of the remainder of the jet pipe downstream of the neck to a diameter more nearly equal to but not less than the maximum throat area of the nozzle, each of said flaps has a portion which extends upstream from the downstream end of the jet pipe, and an actuating mechanism is mounted around the reduced diameter portion of the jet pipe and is operable on said upstream portions of the flaps to move the flaps to vary the outlet area of the nozzle.

Each flap may be mounted at the downstream end of the jet pipe by means of a fixed pivot at a point between its ends, or may be axially translatable as well as being allowed to pivot at the end of the jet pipe. In a further alternative arrangement the flaps may be translatable on an inclined path into and out of the gas stream issuing from the end of the jet pipe.

The actuating mechanism is preferably of the type in which a plurality of jacks translate a unison ring which is connected to each of the flaps.

When mounted on an engine the jet pipe and actuating mechanism are preferably covered by an outer aerodynamic fairing to minimise drag, the fairing extending downstream to the end of the jet pipe so as to cover the nozzle flaps, or at least the greater part of them, when they are in their maximum area position. It will be understood however, that the fairing, instead of being carried by the engine, may be constituted by the fuselage or wing tunnel of an aircraft where the engine is buried therein.

In a preferred form of the invention the flaps are pivoted to the downstream end of the jet pipe and the radially inner surfaces of the nozzle flaps upstream of the pivots are provided with cam tracks, and rollers are carried by the unison ring to run on the tracks to pivot the nozzle flaps. Clearly, however, the positions of the rollers and cam tracks can be reversed if desired so that the cam track is formed on the actuating ring and the rollers are carried by the flaps.

If the upstream portion of the nozzle when pivoted extends to a position which would foul the outer fairing over the jet pipe, the fairing is locally provided with strakes or housings which can be aerodynamically faired into the outer fairing to minimise drag.

The invention will now be more particularly described by way of example only, with reference to the accompanying drawings in which:

FIG. 1 is a sectional elevation through a nozzle flap showing the actuating ring and pivot;

FIG. 2 is a similar sectional elevation through the nozzle at a different circumferential position showing the operating jacks;

Figure 3:
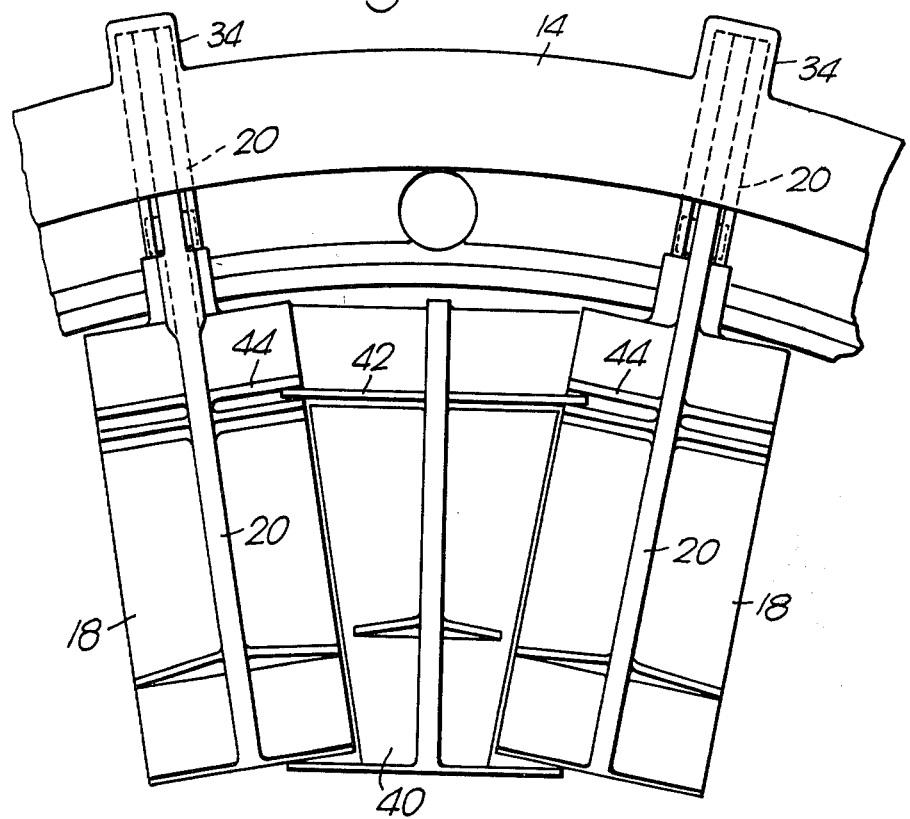
FIG. 3 is an end view of the nozzle of FIG. 1 in the direction of the arrow A showing the flaps in the minimum area position; and, FIG. 4 is an end view similar to that of FIG. 3 showing the nozzle flaps in the maximum area position.

Referring now to the drawings, there is shown in FIG. 1 a side elevation of the top half of an annular variable area nozzle 10 mounted on a jet pipe 12 of a gas turbine engine. The engine itself is not shown in detail although other well-known parts thereof will be referred to in this specification.

The jet pipe 12 is surrounded by an outer fairing 14 which encloses the engine, and it can be seen that the jet pipe is necked i.e. it reduces in diameter steeply upstream of the nozzle thus providing space within the fairing 14 for mounting the nozzle actuating mechanism hereinafter described. By this means the nozzle and actuating mechanism is wholly, or substantially wholly contained within the fairing, the maximum diameter of which is the same as the maximum diameter of the jet pipe 12. The maximum depth of the space is obtained when the reduced diameter portion of the jet pipe is equal to the maximum diameter of the throat of the nozzle i.e. the throat in the maximum nozzle area position. The jet pipe however, must not reduce to a diameter less than the maximum diameter of the throat. The downstream end of the outer fairing is tapered at a conventional boat-tail angle $\alpha$ towards the engine axis to further reduce the nozzle drag.

The nozzle includes an annular arrangement of flaps 16 which are pivotably mounted on the downstream end of the jet pipe 12 so that their downstream ends lie in an annulus to define the outlet of the nozzle, and their upstream ends overlie the jet pipe.

Each of the nozzle flaps 16 is formed by an inverted T-section beam which is pivoted at 22 to the jet pipe 12. The cross-piece of the Tee is widened over that part of the nozzle flaps which lies downstream of the pivot 22 to form rectangular petals 18 at the downstream end of the nozzle. The words upstream and downstream refer to the direction of fluid flow through the nozzle.

The cross-piece of the upstream T-section parts 20 of the flaps are formed on their radially inner surfaces, or undersides, with cam surfaces 24 which are contacted by rollers 26 on an actuating ring 30. The ring 30 is mounted for axial translation, i.e. in an upstream or downstream direction on the jet pipe, by means of actuation jacks 32 (FIG. 2). The ring 30 carries a pair of rollers 26 for each flap 16 which run on the surfaces 24 whereby, as they are translated in a downstream direction from the position shown in FIG. 1, the flaps 16 are pivoted from the maximum area position (shown in full lines) to the minimum area position (shown in dotted lines). The surfaces 24 of the flaps are maintained in contact with the rollers by gas pressures acting on the flaps during operation of the nozzle which are all the time urging the nozzle flaps into the maximum area position.

In order to provide the appropriate boat-tail angle on the fairing 14, the fairing is coned at its downstream end, usually at an included angle $2\alpha$ of about 15°. To avoid the upstream end of the nozzle fouling the fairing 14, strakes or housings 34 are provided to surround the upstream ends of the flaps in the minimum area position. In between the strakes or housing the fairing is conical (FIGS. 3 and 4).

The nozzle petals in this embodiment of the invention form a continuation of a reheat liner 39 within the jet pipe 12. In the minimum area position, (shown dotted in FIG. 1) the petals 18 form a convergent nozzle for non-reheated operation of the engine with the nozzle throat at the outlet of the nozzle. In the maximum area position, (shown in full lines in FIG. 1) the nozzle is only slightly convergent with a larger diameter throat at the nozzle outlet. Alternatively, depending on the flow conditions required during reheat operation, a convergent-divergent nozzle may be formed in the maximum area position by making the reheat liner slightly convergent and the petals divergent forming a throat at the pivot.

As can be seen from FIG. 2 the jacks 32 and the ring 30 are contained within the space between the jet pipe 12 and the fairing 14. Each jack is mounted from a stiffening ring 35 on the fairing and screws onto a nut 36 which in turn is pivoted at 38 to the actuating ring 30.

Figure 4:
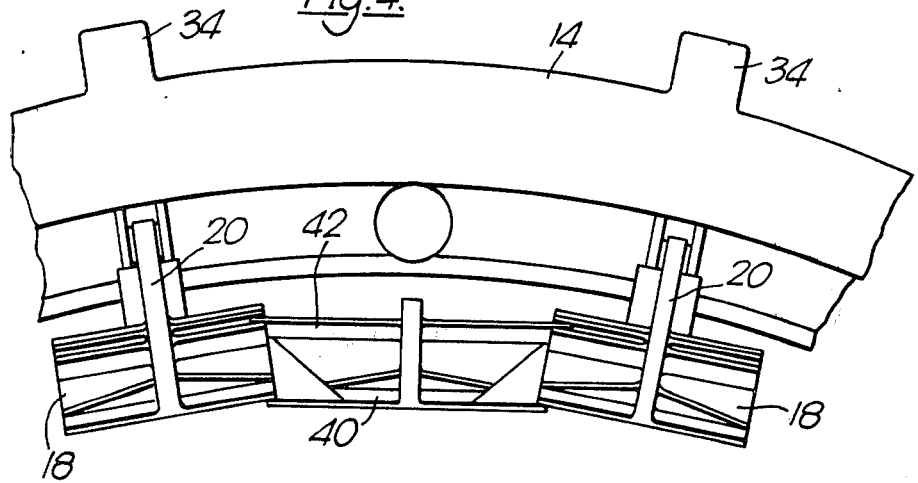

In FIGS. 3 and 4 the end views show details of the nozzle construction. In between each of the petals 18 are slave petals 40 which are hooked onto the petals 18 by hooked ends of ribs 42 on the slave petals engaging ribs 44 on the main petals 18. The fit of the hooked engagement is sufficiently loose to allow freedom of relative movement laterally between the two sets of petals as the nozzle area is varied. This arrangement is conventional in the art and is not described in detail.

The advantages of the present nozzle design over the previously described nozzle are that:

(a) there is no moving outer shroud around the nozzle petals with actuating jacks which need to be covered by a fairing of still greater diameter;

(b) the actuating rollers are in a cooler environment since there is a flow of cooling air over the reheat liner; and (c) in a twin engine installation the two engines can be mounted closer together thus reducing the total base drag of the engine pair.

The nozzle petals have been described with reference to a fixed pivot position between their ends but the invention is still applicable where the nozzle petals translate and may for example pivot about the downstream end of the jet pipe. In such a case the actuation jacks would be pivotally connected to the upstream ends of the petals.

I claim:

1. A jet pipe and variable area final nozzle assembly for a gas turbine engine, comprising:
    a jet pipe having a downstream end;
    a plurality of nozzle flaps each connected by means of a fixed pivot to substantially the downstream end of the jet pipe for pivoting movement to vary the outlet area of the nozzle, a portion of each flap extending upstream of said pivot and overlying said jet pipe;
    an outer fairing having a maximum diameter substantially equal to the maximum jet pipe diameter, fixed to said jet pipe and surrounding the downstream end of said jet pipe and said nozzle flaps, said jet pipe being necked downstream of its connection to the fairing to a diameter more nearly equal to but not less than the maximum throat area of the nozzle;
    an annular space defined by the necked portion of said jet pipe and portions downstream therefrom, and the corresponding portions of said outer fairing; and
    an actuation system disposed in said annular space, comprising:
    a translatable ring disposed around said jet pipe;
    an actuating mechanism connected to said fairing for translating said translatable ring; and
    interconnecting means for interconnecting said translatable ring and said nozzle flaps, to operate said flaps, said ring being interconnected to said flaps upstream of said pivot and being located upstream of said pivot, said actuating mechanism being connected to said fairing on the downstream side of said translatable ring, the translation of said ring causing the pivoting of said flaps.

2. A jet pipe and variable area final nozzle assembly as claimed in claim 1 wherein the means for operating each of the flaps comprises a roller carried by the ring and contacting the upstream portion of the flap on the radially inner side thereof.

3. A jet pipe and variable area final nozzle assembly as claimed in claim 1 wherein the outer fairing is provided with strakes for housing the upstream ends of the flaps when the flaps are in their minimum area position.

* * * * *